July 8, 1930.  W. H. GREEN  1,770,307
PROPORTIONING APPARATUS
Filed Nov. 26, 1924
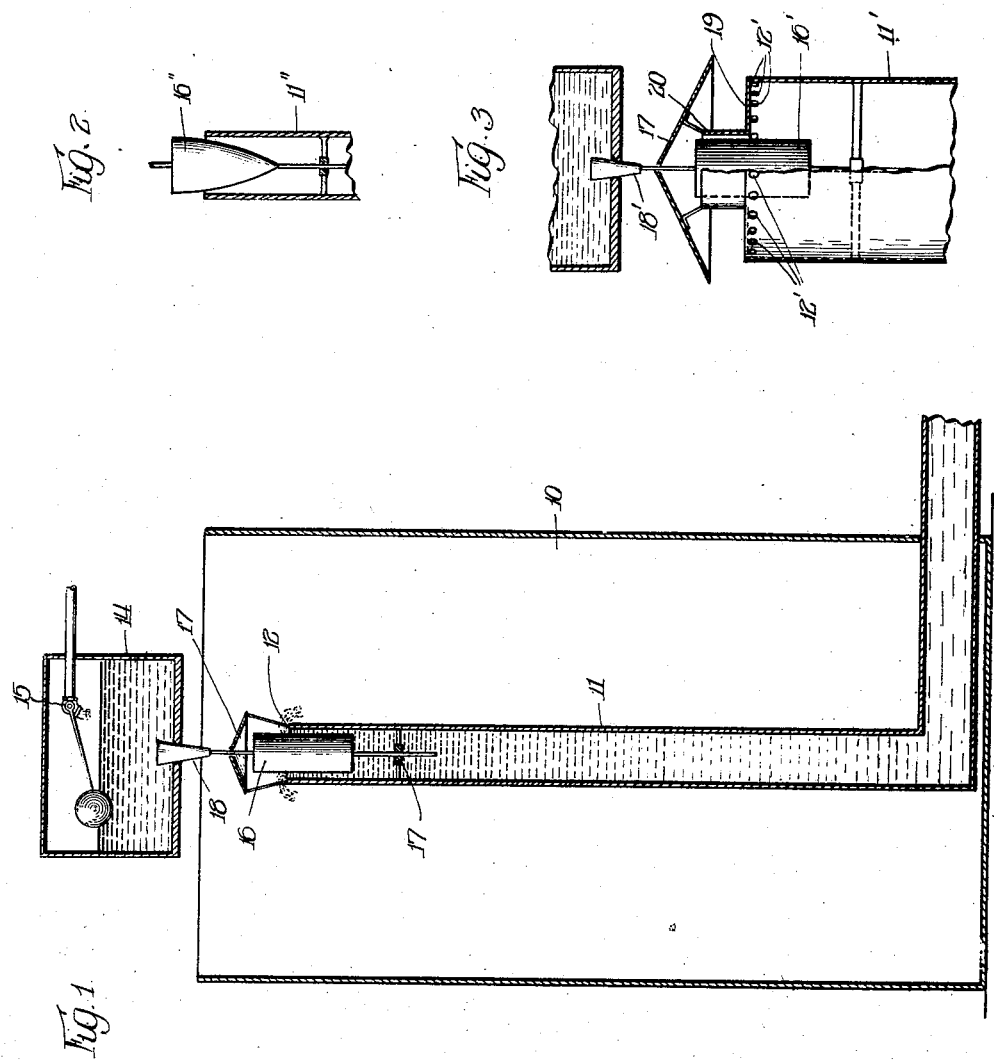
Witness:
R. Burkhardt.
Inventor:
Walter H. Green,
By O'Connell, Bristol & Warden, Attys.

Patented July 8, 1930

1,770,307

UNITED STATES PATENT OFFICE

WALTER H. GREEN, OF CHICAGO, ILLINOIS, ASSIGNOR, BY MESNE ASSIGNMENTS, TO GENERAL ZEOLITE COMPANY, OF CHICAGO, ILLINOIS, A CORPORATION OF ILLINOIS

PROPORTIONING APPARATUS

Application filed November 26, 1924. Serial No. 752,372.

This invention relates to apparatus for automatically controlling the feed of material in proportion to the supply of a liquid and in accordance with variations in the rate of supply. It finds particular application in the treatment of water for softening it or for the removal of scale-forming ingredients, wherein its purpose is to regulate the supply of treating liquid so as to maintain a uniform dosage of the raw water.

The general purpose of the invention is the provision of a very simple apparatus which is certain and accurate in its operation and which is immediately responsive to variations in the rate of supply.

Other and further objects of the invention will be pointed out hereinafter, indicated in the appended claims or obvious to one skilled in the art upon an understanding of the present disclosure.

For the purpose of this application, I have elected to explain the invention by reference to certain structural illustrations which are entirely diagrammatic, as these serve to illustrate the principal and salient features of the invention, while the actual structural embodiments of the invention are susceptible of substantial variations as to form and arrangement.

In the drawing forming a part of this specification;

Fig. 1 is a diagrammatic sectional elevation of water treating apparatus, illustrating the invention;

Fig. 2 is a diagrammatic detail in the nature of a partial sectional elevation of controlling elements differing in form from those illustrated in Fig. 1; and Fig. 3 is a similar detail illustrating control elements of still another form, same being partly in elevation and partly in section.

In the mixing of materials, as exemplified particularly in the treatment of water for the removal of hardening elements, it is important that accurate proportion of one material to the other be maintained. This necessitates that the supply of one of the materials be subject to variation in accordance with variations in the supply of the other. Hence, it follows that the controlled variation must be accomplished automatically and must be immediately responsive to the other. Among the forms of apparatus employed are those in which regulation is accomplished through or dependent upon a by-passed proportion of the controlling liquid, and others in which the regulation is accomplished directly from the main supply. Each type is supposed to have certain distinctive advantages, and through the present invention I attain the important advantages of both.

The purpose of the invention will best be understood by reference immediately to the diagrams. Let it be understood that in these the reference character 10 designates a treating tank suitable for use in the softening treatment of water as by the lime and soda process. With this is associated a supply conduit 11 through which the raw water is fed to the treating tank, the rate of supply being subject to variation from various causes. The reference numeral 14 designates a feed tank for a treating liquid, same being equipped to maintain a constant level of the treating liquid therein as by means of the float controlled valve 15. The conduit 11 affords a discharge orifice 12 through which the water is discharged into the treating tank. Obviously the rate of discharge through this orifice is subject to variation incident to variations in the rate of supply to the conduit 11, which is induced by a hydrostatic head or a pump. Associated with the orifice 12 in such fashion as to be subject to the hydrostatic pressure of the water at the orifice, is a float 16, which is supported by the water and guided for vertical movement by the guides 17. The relationship of the float 16 to the discharge orifice 12 is such that it is affected by both the static pressure and the flow movement of the water to the discharge orifice, same having a tendency to raise the float. Thus, the momentary vertical position of the float is representative of the influences controlling the volume of discharge from the orifice at any given time, such position being variable up and down coincidently with increases and decreases in the volume of discharge. The float operates a regulating valve 18 which controls the discharge of treating liquid from the tank 15 to the treating tank 10. The form of valve 17 may be such that discharge from tank 15 is varied in the proportion that the flow through orifice 12 varies, viz, as the square root of the head which controls the position of the float. As a result, the treating material is supplied to the raw water in constant proportion to the supply of the latter, any variation in the head at the orifice producing automatically a proportionate variation in the supply of treating liquid. An important feature contributing to the accuracy and timeliness of the proportioning of treating material is the arrangement whereby the position of the float is truly representative of the momentary discharge through the orifice. This is accomplished by rendering the float subject to both the static and kinetic pressure of water being discharged at the orifice, and the elimination of disturbing factors or influences, such as friction, in the operation of the float.

In the form diagrammatically illustrated in Fig. 3 the conduit 11' has a plurality of small orifices 12' distributed about its upper portion, and has its end partly closed by a top 19, which affords an opening. About this opening is disposed a collar 20, and the float 16' is arranged to extend through said collar and opening into the upper portion of the conduit 11'. It is intended that the collar 20 be of sufficient height to accommodate the head of water over the orifices 12' without overflow over the top of the collar, which head will vary in accordance with the rate at which water is supplied to the conduit 11'. Accordingly, the vertical position of the float thus disposed will vary in accordance with variations in the volume of discharge through the orifice, and through its control of a properly dimensioned regulating valve 18' will maintain the desired proportion in the supply of treating liquid to the raw water. Inasmuch as the head of water in collar 20 is the result of both the static and kinetic pressures effective to induce discharge of the water at the orifices, the position of the float will be truly representative of the momentary volume of discharge through the orifices. The float, being sustained entirely by the water and apart from the collar 20, is not subject to friction such as to disaccommodate its movement to variations in the raw water discharge.

In Fig. 2 is illustrated a further variation wherein the float 16" is shaped and proportioned in such fashion that its buoyancy will vary as some desired function of the head of the water in which it is sustained in the conduit 11". In the instance here illustrated the discharge orifice will vary in area at different vertical positions of the float, which feature is to be taken into consideration in the designing of the latter.

An advantage of the present invention is the simplification which it permits in regulating apparatus of automatic type, which, coupled with its immediate responsiveness and its constant accuracy, particularly qualifies it for use in the treatment of water from a supply which is subject to variation in head or feed pressure.

What I claim is:

1. In apparatus of the class described, the combination of a conduit having a discharge orifice, a float arranged to be supported by liquid at the orifice, said float spaced from the walls of the conduit and being variable in position in proportion to variation in pressure of liquid at the orifice, and means operable by the float for varying feed of material to liquid discharged from the conduit.

2. In a float control mechanism, a conduit for carrying liquid, a float in said conduit, and means positioning the float spaced from the walls of the conduit to form an annular passage for the liquid between the float and the walls of the conduit while flow is taking place.

In testimony whereof I have hereunto signed my name.

WALTER H. GREEN.